US012809961B2

(12) United States Patent
Guan

(10) Patent No.: US 12,809,961 B2
(45) Date of Patent: Nov. 24, 2026

(54) METHOD AND DEVICE FOR VERIFYING DISPLAY TERMINAL, STORAGE MEDIUM, AND ELECTRONIC DEVICE

(71) Applicant: BOE TECHNOLOGY GROUP CO., LTD., Beijing (CN)

(72) Inventor: Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/729,891

(22) PCT Filed: Jan. 6, 2023

(86) PCT No.: PCT/CN2023/070804
§ 371 (c)(1),
(2) Date: Jul. 18, 2024

(87) PCT Pub. No.: WO2023/142957
PCT Pub. Date: Aug. 3, 2023

(65) Prior Publication Data
US 2025/0111032 A1 Apr. 3, 2025

(30) Foreign Application Priority Data
Jan. 25, 2022 (CN) ......................... 202210088357.4

(51) Int. Cl.
*G06F 21/44* (2013.01)
*G06F 11/10* (2006.01)

(52) U.S. Cl.
CPC .......... *G06F 21/44* (2013.01); *G06F 11/1004* (2013.01)

(58) Field of Classification Search
CPC ............................. G06F 21/44; G06F 11/1004
See application file for complete search history.

(56) References Cited

U.S. PATENT DOCUMENTS 10,439,815 B1 * 10/2019 Poder .................... H04L 9/3236
10,742,555 B1 * 8/2020 Shalev .................. H04L 47/283
(Continued)

FOREIGN PATENT DOCUMENTS

CN 104021011 A 9/2014
CN 104993936 A 10/2015
(Continued)

OTHER PUBLICATIONS

International Search Report and Written Opinion mailed on Mar. 10, 2023, in corresponding PCT/CN2023/070804, 16 pages.

*Primary Examiner* — Moeen Khan
*Assistant Examiner* — Thomas A Carnes
(74) *Attorney, Agent, or Firm* — XSENSUS LLP

(57) ABSTRACT

A method and device for verifying a display terminal, a storage medium, and an electronic device, relating to the technical field of security identification. The method includes acquiring a device code of the display terminal and a first current time node, and generating first timestamp data based on the first current time node; performing cyclic redundancy check (CRC) on the first timestamp data and the device code to obtain a first data check code, and encrypting the device code, the first timestamp data, and the first data check code to obtain first encrypted data; and sending the first encrypted data via a first terminal device to a server, enabling the server to decrypt the first encrypted data and to verify authenticity of the display terminal based on the device code, the first timestamp data, and the first data check code that are obtained by the decryption.

6 Claims, 5 Drawing Sheets

(56) References Cited

U.S. PATENT DOCUMENTS

| | | | | |
|---|---|---|---|---|
| 10,992,460 | B2 * | 4/2021 | Sun | H04L 9/3247 |
| 2006/0206728 | A1 * | 9/2006 | Masuda | G06F 21/6218 713/193 |
| 2016/0255083 | A1 * | 9/2016 | Svigals | H04L 9/3228 726/4 |
| 2016/0285630 | A1 * | 9/2016 | Abraham | H04L 65/611 |
| 2016/0352524 | A1 * | 12/2016 | Kinney | H04L 9/3247 |
| 2017/0012978 | A1 * | 1/2017 | Lin | H04L 63/0884 |
| 2017/0324563 | A1 * | 11/2017 | Isshiki | G09C 1/00 |
| 2019/0206562 | A1 * | 7/2019 | Shelton, IV | H04L 67/10 |
| 2019/0332466 | A1 * | 10/2019 | Son | G06F 11/1004 |
| 2020/0082370 | A1 * | 3/2020 | Yang | G06Q 20/20 |
| 2020/0092090 | A1 * | 3/2020 | Lin | H04L 9/3242 |
| 2020/0244596 | A1 * | 7/2020 | Le | H04L 49/555 |
| 2020/0401732 | A1 * | 12/2020 | Hwang | G06F 7/582 |
| 2021/0219296 | A1 * | 7/2021 | Lei | H04L 5/0094 |
| 2021/0248224 | A1 * | 8/2021 | Muto | H04L 9/10 |
| 2022/0052790 | A1 * | 2/2022 | Lei | H04L 5/0053 |
| 2023/0017740 | A1 * | 1/2023 | He | H04L 67/133 |
| 2025/0111032 | A1 * | 4/2025 | Guan | G06F 21/44 |

FOREIGN PATENT DOCUMENTS

| | | | |
|---|---|---|---|
| CN | 108650082 | A | 10/2018 |
| CN | 108737394 | A | 11/2018 |
| CN | 108959990 | A | 12/2018 |
| CN | 110493267 | A | 11/2019 |
| CN | 111917555 | A | 11/2020 |
| CN | 114490167 | A | 5/2022 |

* cited by examiner

METHOD AND DEVICE FOR VERIFYING DISPLAY TERMINAL, STORAGE MEDIUM, AND ELECTRONIC DEVICE

CROSS-REFERENCE TO RELATED APPLICATIONS

This application is a U.S. national phase application of International Application No. PCT/CN2023/070804, filed on Jan. 6, 2023, which claims priority to the Chinese Patent Application No. 202210088357.4, filed on Jan. 25, 2022, entitled "METHOD AND APPARATUS FOR VERIFYING DISPLAY TERMINAL, STORAGE MEDIUM, AND ELECTRONIC DEVICE," and the entire contents of each are hereby incorporated by reference in their entireties.

TECHNICAL FIELD

The present disclosure relates to the field of security identification technology, and in particular, to a method for verifying a display terminal, a device for verifying a display terminal, a computer-readable storage medium, and an electronic device.

BACKGROUND

One of some schemes for verifying the authenticity of display terminals can be achieved as follows: an information tag is generated based on a terminal code of the display terminal and printed, which is then affixed to the corresponding location on the display device. When a user needs to verify the authenticity of the display terminal, the user can scan the information tag with a mobile terminal. Subsequently, the terminal code obtained from the scan is sent to a corresponding server for comparison and confirmation. Based on a comparison and confirmation result, the authenticity of the display terminal is identified.

SUMMARY

According to one aspect of the present disclosure, there is provided a method for verifying a display terminal, which is applied to the display terminal and includes:

- acquiring a device code of the display terminal to be verified and a first current time node, and generating first timestamp data based on the first current time node;
- performing cyclic redundancy check (CRC) on the first timestamp data and the device code to obtain a first data check code, and encrypting the device code, the first timestamp data, and the first data check code to obtain first encrypted data; and
- sending the first encrypted data via a first terminal device to a server, enabling the server to decrypt the first encrypted data and to verify authenticity of the display terminal to be verified based on the device code, the first timestamp data, and the first data check code that are obtained by the decryption.

In an exemplary embodiment of the present disclosure, acquiring the device code of the display terminal to be verified and the first current time node includes:

- receiving an authenticity verification instruction sent by the first terminal device via a preset communication interface; and
- in response to the authenticity verification instruction, acquiring the device code from an encoding storage unit of the display terminal to be verified, and acquiring the first current time node from a real-time clock chip of the display terminal to be verified.

In an exemplary embodiment of the present disclosure, receiving the authenticity verification instruction sent by the first terminal device via the preset communication interface includes:

- establishing a communication connection between the display terminal to be verified and the first terminal device based on the preset communication interface; and
- receiving the authenticity verification instruction that is sent, via the preset communication interface, by the first terminal device in response to a touch operation on a verification application program corresponding to the display terminal to be verified.

In an exemplary embodiment of the present disclosure, performing CRC on the first timestamp data and the device code to obtain the first data check code includes:

- converting the first timestamp data and the device code into binary to obtain a first byte code, and calculating a first byte length of the first byte code;
- calculating a byte difference between the first byte length and a preset byte length, and determining a second byte length of a padding character required for the first byte code based on the byte difference;
- filling the padding character with the second byte length to a preset position of the first byte code to obtain a first to-be-calculated code; and
- obtaining the first data check code by performing calculation based on a preset generator polynomial and the first to-be-calculated code.

In an exemplary embodiment of the present disclosure, encrypting the device code, the first timestamp data, and the first data check code to obtain the first encrypted data includes:

- arranging the device code, the first timestamp data, and the first data check code according to a preset arrangement rule to obtain first to-be-encrypted data, and encrypting the first to-be-encrypted data based on a preset encryption algorithm to obtain the first encrypted data.

In an exemplary embodiment of the present disclosure, arranging the device code, the first timestamp data, and the first data check code according to the preset arrangement rule to obtain the first to-be-encrypted data includes:

- splitting the device code to obtain a plurality of separate codes each corresponding to a separate character; and
- obtaining the first to-be-encrypted data by inserting each timestamp byte included in the first timestamp data into a middle position between two adjacent separate codes of the plurality of separate codes in a single-spaced or multi-spaced manner, and placing the first data check code after the last separate code.

In an exemplary embodiment of the present disclosure, encrypting the first to-be-encrypted data based on the preset encryption algorithm to obtain the first encrypted data includes:

- receiving a random public key from a random key pair sent by the server, where the random key pair is generated by the sever using a preset asymmetric encryption algorithm; and
- encrypting the first to-be-encrypted data using the random public key to obtain the first encrypted data.

According to one aspect of the present disclosure, there is provided a method for verifying a display terminal, which is applied to a server and includes:

receiving first encrypted data sent by a display terminal to be verified via a first terminal device;

decrypting the first encrypted data using a random private key from a random key pair to obtain a device code of the display terminal to be verified, first timestamp data, and a first data check code obtained based on the device code and the first timestamp data;

performing cyclic redundancy check (CRC) on the device code and the first timestamp data to obtain a second data check code, and comparing the first data check code and the second data check code; and verifying, in response to determining that the first data check code and the second data check code are consistent, legality of the device code and the first timestamp data, obtaining a first verification result, and verifying authenticity of the display terminal to be verified based on the first verification result.

In an exemplary embodiment of the present disclosure, verifying the legality of the device code and the first timestamp data, obtaining the first verification result, and verifying the authenticity of the display terminal to be verified based on the first verification result, includes:

determining whether the device code exists in a preset product code library;

in response to determining that the device code exists in the preset product code library, obtaining a second current time node at the server upon receiving the first encrypted data, and generating second timestamp data based on the second current time node;

calculating a time difference between the second timestamp data and the first timestamp data, and determining whether the time difference is greater than a first preset threshold; and in response to determining that the time difference is less than or equal to the first preset threshold, determining that the display terminal to be verified is a genuine product.

In an exemplary embodiment of the present disclosure, the method for verifying the display terminal further includes:

in response to determining that the first data check code and the second data check code are inconsistent, and/or that the device code does not exist in the preset product code library, and/or that the time difference is greater than the first preset threshold, determining that the display terminal to be verified is a counterfeit product.

In an exemplary embodiment of the present disclosure, the method for verifying the display terminal further includes:

in response to determining that the display terminal to be verified is the genuine product, generating first prompt information indicating verification success corresponding to the display terminal to be verified, and sending the first prompt information to the first terminal device for the first terminal device to display the first prompt information; or in response to determining that the display terminal to be verified is the counterfeit product, generating second prompt information indicating verification failure corresponding to the display terminal to be verified, and sending the second prompt information to the first terminal device for the first terminal device to display the second prompt information.

According to one aspect of the present disclosure, there is provided a system for verifying a display terminal, including:

a display terminal to be verified, configured to perform a method for verifying the display terminal as described in any of the exemplary embodiments applied to the display terminal side;

a first terminal device, connected to the display terminal to be verified via a preset hardware interface, and configured to: send the first encrypted data to a server; and a server, connected to the first terminal device via a network, and configured to perform a method for verifying the display terminal as described in any of the exemplary embodiments applied to the server side;

where the first terminal device is further configured to display prompt information received from the server that corresponds to a verification result on the authenticity of the display terminal to be verified.

According to one aspect of the present disclosure, there is provided a computer-readable storage medium on which a computer program is stored. The computer program, when executed by a processor, causes the processor to perform the method for verifying a display terminal described in any of the above exemplary embodiments.

According to one aspect of the present disclosure, there is provided an electronic device, including:

a processor; and a memory for storing instructions executable for the processor, where the processor is configured to execute the instructions to perform the method for verifying a display terminal described in any of the above exemplary embodiments.

It should be understood that the above general description and the detailed description that follows are merely exemplary and explanatory and do not limit the present disclosure.

BRIEF DESCRIPTION OF THE DRAWINGS

The accompanying drawings herein are incorporated into and form a part of this specification, illustrating embodiments consistent with the present disclosure and being used in conjunction with the specification to explain the principles of the present disclosure. It will be apparent that the drawings described below are merely some embodiments of the present disclosure, and other drawings may be obtained from these drawings by a person of ordinary skill in the art without creative labor.

DETAILED DESCRIPTION

Figure 1:
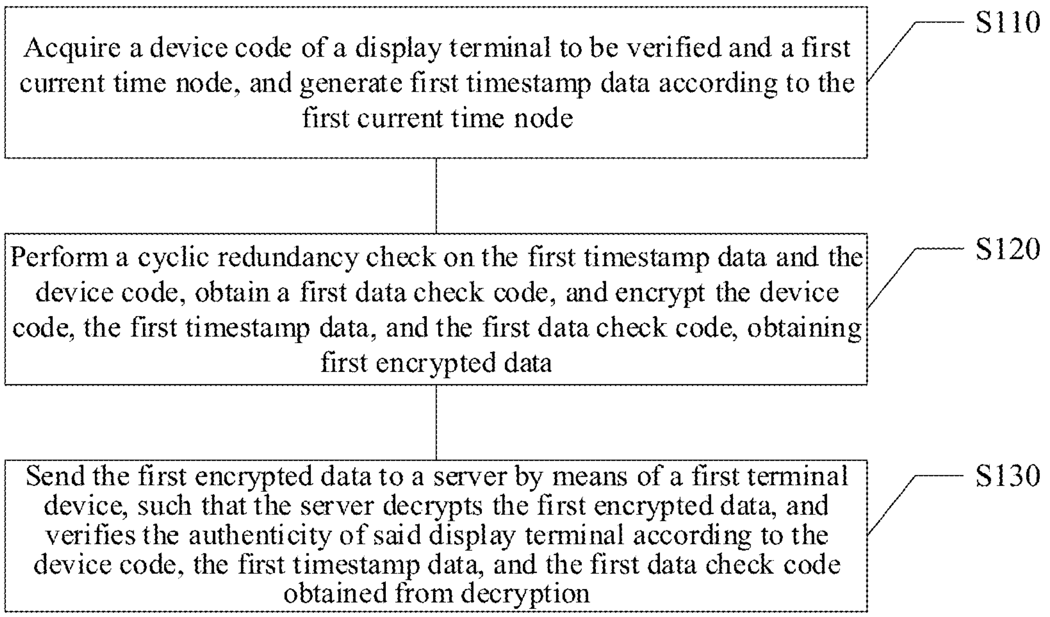
FIG. 1 schematically illustrates a flowchart of a method for verifying a display terminal on the display terminal side according to an exemplary embodiment of the present disclosure.

Exemplary embodiments will now be described more fully with reference to the accompanying drawings. However, the exemplary embodiments may be implemented in various forms and should not be construed as being limited to the embodiments set forth herein; rather, these embodiments are provided to make the present disclosure more comprehensive and complete, and to fully convey the concept of the exemplary embodiments to those skilled in the art. The described features, structures, or characteristics may be combined in any suitable manner in one or more embodiments.

The drawings are illustrative of the present disclosure and are not necessarily drawn to scale. The same or similar reference numerals in the drawings denote the same or similar parts, and thus, redundant descriptions thereof will be omitted. Some block diagrams shown in the drawings represent functional entities that may not necessarily correspond to physically or logically independent entities. These functional entities can be implemented in software, in one or more hardware modules or integrated circuits, or in various network and/or processor devices and/or microcontroller devices.

A splicing display unit can be used either independently as a display or for splicing to form an ultra-large screen. Depending on different usage requirements, the function of variable screen size adjustment can be achieved through a graphics processor, including, for example, multi-screen display on a single screen, single-screen display on a single screen, arbitrarily splicing screens combined for display, image splicing, full-screen splicing. In addition, during an image display process, optional compensation or masking of image borders is possible. The splicing display unit can also support functions, including digital signal roaming, scaling/stretching, cross-screen display, settings and operations of various display schemes, or real-time processing of full HD signals, etc.

A conventional anti-counterfeiting method for splicing screens by manufacturers is to affix a sticker printed with a bar code or QR code to a machine casing. The user can scan the barcode or QR code with a client on a mobile phone to send it to the cloud for database comparison and confirmation to perform authenticity identification. However, because the barcode or QR code for each device is fixed, counterfeiters can copy the barcode or QR code and make stickers to imitate products. Therefore, the method of using fixed barcodes or QR codes cannot effectively prevent infringement and counterfeiting of splicing screens.

Based on this, the exemplary embodiment provides a method for verifying a display terminal, which can run on a display terminal such as a splicing screen, display screen, or integrated conference system. Of course, those skilled in the art can also implement the disclosed method on other platforms as needed, without specific limitations in this exemplary embodiment. Referring to FIG. 1, the method for verifying the display terminal can include the following steps.

Step S110, acquiring a device code of the display terminal to be verified and a first current time node, and generating first timestamp data based on the first current time node.

Step S120, performing cyclic redundancy check (CRC) on the first timestamp data and the device code to obtain a first data check code, and encrypting the device code, the first timestamp data, and the first data check code to obtain first encrypted data.

Step S130, sending the first encrypted data via a first terminal device to a server, enabling the server to decrypt the first encrypted data and to verify authenticity of the display terminal to be verified based on the device code, the first timestamp data, and the first data check code that are obtained by the decryption.

On one hand, by applying timestamp data in addition to the device code, which cannot be copied, the above method for verifying the display terminal avoids the issue of lower accuracy of the validation results on the authenticity of the display terminal caused by illegal manufacturers copying label information generated based on device codes. On the other hand, by performing CRC on the first timestamp data and the device code to obtain the first data check code, the method also avoids the issue of lower accuracy of the validation results on the authenticity of the display terminal caused by data leakage during transmission of the first encrypted data from the first terminal device to the server. Thus, the method further improves the accuracy of verifying the authenticity of the display terminal to be verified.

The detailed explanation and description of the method for verifying the display terminal according to this exemplary embodiment are provided below in conjunction with the drawings.

First, a system for verifying the display terminal in the exemplary embodiment of the present disclosure is explained and described. Specifically, referring to FIG. 2, the system for verifying the display terminal may include:

a display terminal 210 (i.e., the display terminal to be verified), a first terminal device 220, and a server 230, where the display terminal is connected to the first terminal device via a hardware interface, and the first terminal device is connected to the server 230 via wired or wireless network. The hardware interface may include an RS-232 interface, Type-C interface, or USB interface, without specific limitations in this example.

Figure 3:
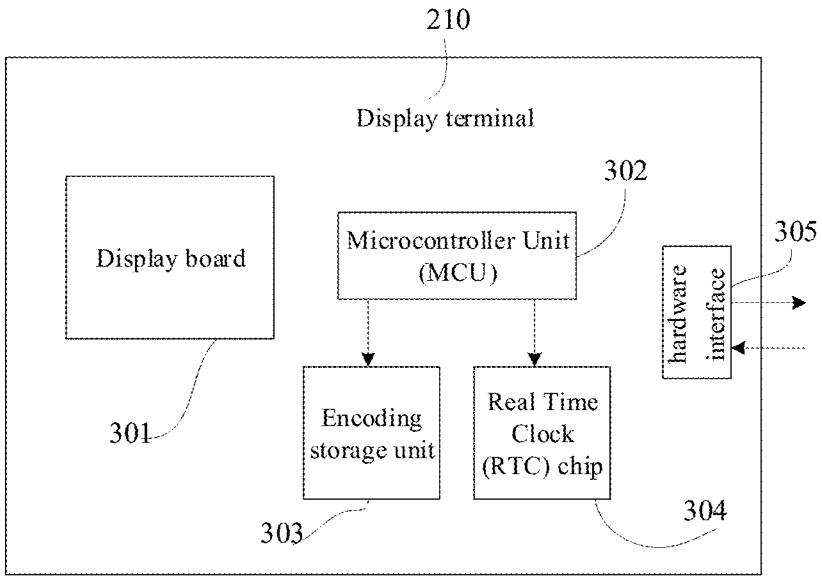
FIG. 3 schematically illustrates a structural diagram of a display terminal according to an exemplary embodiment of the present disclosure.

Furthermore, referring to FIG. 3, the display terminal 210 may include a display board 301, Microcontroller Unit (MCU) 302, encoding storage unit 303, Real Time Clock (RTC) chip 304, and hardware interface 305. The display board can be used for displaying images. The MCU can be used to generate the first encrypted data as described in this exemplary embodiment, i.e., can be used to implement the verification method applied on the display terminal side as described in this exemplary embodiment. The RTC chip can be used to generate the first current time node. The encoding storage unit can be used to record the device code of the display terminal, which can be the Serial Number (SN) of the display terminal.

It should be noted that the device code (i.e., the product serial number) of the display terminal is exported from the manufacturer's serial number database when leaving the factory. The device code is a SN code consisting of multiple bytes and burned automatically into a fixed Flash address unit, i.e., the encoding storage unit mentioned above, of the display terminal. This method prevents duplication of product serial numbers and thereby avoids issues of low accuracy of the verification result on the authenticity of the display terminal.

Figure 2:
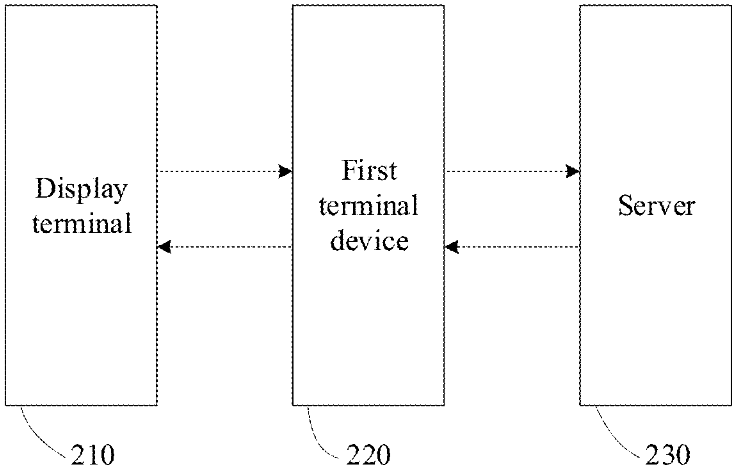
FIG. 2 schematically illustrates a block diagram of a system for verifying a display terminal according to an exemplary embodiment of the present disclosure.

The method for verifying the display terminal shown in FIG. 1 is explained and described below in conjunction with FIG. 2 and FIG. 3.

In Step S110, the device code of the display terminal to be verified and the first current time node are acquired, and based on the first current time node, the first timestamp data is generated.

In this exemplary embodiment, acquiring the device code of the display terminal to be verified and the first current time node may specifically include: firstly, receiving an authenticity verification instruction sent by the first terminal device via a preset communication interface; and secondly, in response to the authenticity verification instruction, acquiring the device code from the encoding storage unit of the display terminal to be verified, and acquiring the first current time node from the real-time clock chip of the display terminal to be verified.

The display terminal to be verified may receive the authenticity verification instruction from the first terminal device in the following manner: firstly, establishing a communication connection between the display terminal to be verified and the first terminal device based on the preset communication interface; and secondly, receiving the authenticity verification instruction that is sent, via the preset communication interface, by the first terminal device in response to a touch operation on a verification application program corresponding to the display terminal to be verified.

For example, when a user needs to authenticate a purchased display terminal, the user can connect the display terminal's hardware interface (e.g., RS-232 interface) to the first terminal device (e.g., PC, desktop computer, tablet, etc.). After a communication connection is established between the display terminal to be verified and the first terminal device, the user can open the client corresponding to the display terminal on the first terminal device to initiate a specific identification process. For example, after the client is started, the user can click on an identification and interaction control. When the first terminal device receives an instruction triggered by the identification and interaction control, the first terminal device can generate an authenticity verification instruction, e.g., 0XAA, and then send the authenticity verification instruction to the display terminal to be verified via the hardware interface. When receiving the authenticity verification instruction, the display terminal to be verified can retrieve its device code from the encoding storage unit and the first current time node from the real-time clock chip.

Furthermore, after acquiring the first current time node, the first timestamp data can be generated based on the first current time node. During the generation of the first timestamp data based on the first current time node, the millisecond of this time node may be directly replaced with a specific character (e.g., 0) or it can remain unchanged. In addition, the first current time node can be signed using the device code of the display terminal to be verified, and thus the first timestamp data is generated based on the signed first current time node, without specific limitations by this example. The resulting first timestamp data consists of 4 bytes, equivalent to 32-bit data. However, the data with other byte lengths may be generated based on actual needs, without specific limitations by this example.

It should be further noted that, the display terminal to be verified above can be a display screen with splicing functionality, an integrated conference system, or a smart city-based display screen, among others, without limitations by this example.

In Step S120, cyclic redundancy check (CRC) is performed on the first timestamp data and the device code to obtain the first data check code, and the device code, the first timestamp data, and the first data check code are encrypted to obtain the first encrypted data.

Figure 4:
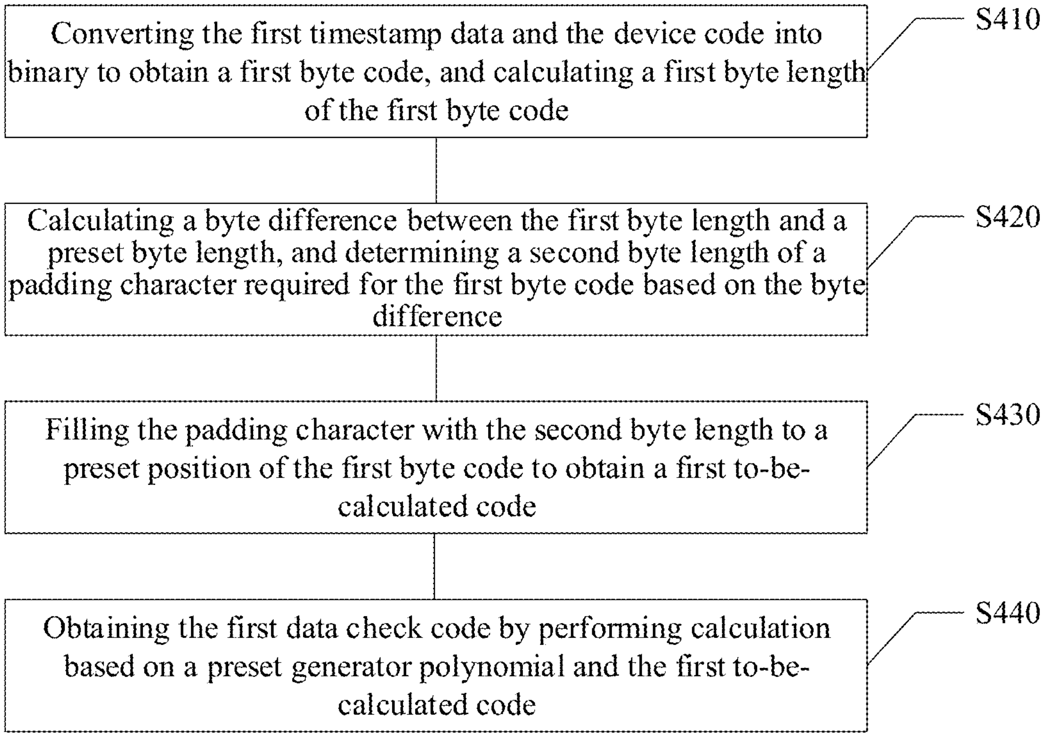
FIG. 4 schematically illustrates a flowchart of a method in which cyclic redundancy check (CRC) is performed on first timestamp data and a device code to obtain a first data check code according to an exemplary embodiment of the present disclosure.

In this exemplary embodiment, the first timestamp data and device code undergo cyclic redundancy check (CRC) to obtain the first data check code. Specifically, it may, as shown in FIG. 4, include the following steps.

Step S410, converting the first timestamp data and the device code into binary to obtain a first byte code, and calculating a first byte length of the first byte code.

Step S420, calculating a byte difference between the first byte length and a preset byte length, and determining a second byte length of a padding character required for the first byte code based on the byte difference.

Step S430, filling the padding character with the second byte length to a preset position of the first byte code to obtain a first to-be-calculated code.

Step S440, obtaining the first data check code by performing calculation based on a preset generator polynomial and the first to-be-calculated code.

The steps S410 to S440 are explained and described as follows. Firstly, the first timestamp data and device code can be converted into binary to obtain the first byte code, where the first byte code can be, for example, 1101011011 (this is purely illustrative and does not necessarily correspond to the actual first timestamp data and device code). Subsequently, the byte difference between the first byte length of the first byte code and the preset byte length (e.g., N) can be calculated, and based on this difference, the second byte length required for padding characters can be determined. For example, if the byte difference is 4, the second byte length can be 4. Further, at the end position of the first byte code, padding characters with the second byte length can be added, where the padding character can be, for example, 0. In this case, the resulting first to-be-calculated code can be 11010110110000.

Finally, after obtaining the first to-be-calculated code, the first data check code can be obtained through the calculation based on the preset generator polynomial and the first to-be-calculated code. Specifically, during the calculation process, the first data check code is derived as the remainder obtained from dividing the first to-be-calculated code by the generator polynomial. Specifically, the generator polynomial can be shown as follows in Equation (1):

$$CRC-32 = x^{32}+x^{26}+x^{23}+x^{22}+x^{16}+x^{12}+x^{10}+x^{8}+x^{7}+x^{5}+x^{4}+x^{2}+x^{32}+x^{1}+1.$$

It should be further noted that, the above generator polynomial may also include CRC-16 or CRC-8, among others, without specific limitations by this example. Moreover, by providing the first data check code, it can prevent the issue of lower accuracy of the authenticity verification results due to data leakage during the transmission of the first encrypted data from the first terminal device to the server, and thus further improve the accuracy of the authenticity verification results of the display terminal to be verified.

Furthermore, in this exemplary embodiment, once the first data check code is obtained, encryption is performed on the device code, first timestamp data, and first data check code to generate the first encrypted data. Specifically, it may include: arranging the device code, the first timestamp data, and the first data check code according to a preset arrangement rule to obtain first to-be-encrypted data, and encrypting the first to-be-encrypted data based on a preset encryption algorithm to obtain the first encrypted data.

Arranging the device code, first timestamp data, and first data check code according to a preset arrangement rule to obtain the first to-be-encrypted data can be implemented in the following manner: firstly, splitting the device code to obtain a plurality of separate codes each corresponding to a separate character; secondly, obtaining the first to-be-encrypted data by inserting each timestamp byte included in the first timestamp data into a middle position between two adjacent separate codes of the plurality of separate codes in a single-spaced or multi-spaced manner, and placing the first data check code after the last separate code.

Figure 5:
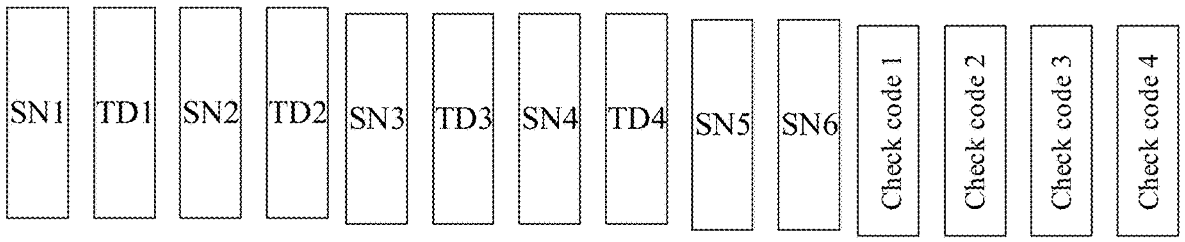
FIG. 5 schematically illustrates a schematic diagram of a data structure of first to-be-encrypted data according to an exemplary embodiment of the present disclosure.

For example, as shown in FIG. 5, splitting the device code results in a plurality of separate codes such as SN1, SN2, SN3, SN4, SN5, and SN6. Subsequently, inserting the timestamp bytes (e.g., TD1, TD2, TD3, and TD4, etc.) included in the timestamp data between these separate codes can be performed in a single-spaced manner, which is, for example, as shown in FIG. 5, i.e., SN1, TD1, SN2, TD2, SN3, TD3, SN4, TD4, SN5, SN6. Alternatively, it can be performed in a multi-spaced manner, e.g., SN1, SN2, TD1, TD2, SN3, TD3, TD4, SN4, SN5, SN6, etc. There are no specific limitations by this example. Finally, the first data check code is placed at the end of SN6 to obtain the first to-be-encrypted data, which is, for example, as shown in FIG. 5, i.e., SN1, TD1, SN2, TD2, SN3, TD3, SN4, TD4, SN5, SN6, Check code 1, Check code 2, Check code 3, and Check code 4. It should be further noted that, by arranging the device code and timestamp data in a spaced manner, it can avoid the issue of device code leakage caused by data capture during transmission, thereby enhancing the security of the device code and also improving the accuracy of the authenticity verification results.

Furthermore, based on the preset encryption algorithm, encrypting the first to-be-encrypted data to obtain the first encrypted data can be implemented in the following manner: receiving a random public key from a random key pair sent by the server, where the random key pair is generated by the server using a preset asymmetric encryption algorithm; and encrypting the first to-be-encrypted data using the random public key to obtain the first encrypted data. Specifically, in order to realize the encryption of the first to-be-encrypted data and facilitate the server to decrypt the first encrypted data, it is necessary for the first terminal device to first receive the random public key in the random key pair sent by the server, and then send the random public key to the display terminal to be verified through the RS-232 interface. The random key pair is generated randomly by the server using an asymmetric encryption algorithm, such as AES-128 encryption algorithm, although other asymmetric encryption algorithms may also applicable in this example without specific limitations.

In step S130, the first encrypted data is sent to the server via the first terminal device, enabling the server to decrypt the first encrypted data and verify the authenticity of the display terminal to be verified based on the device code, the first timestamp data, and the first data check code that are obtained by the decryption.

In this exemplary embodiment, after obtaining the first encrypted data, the display terminal to be verified sends this data to the first display terminal via the RS-232 interface. Subsequently, the first display terminal sends this first encrypted data to the server via wired or wireless network. Upon receiving the first encrypted data, the server decrypts it using the random private key from the random key pair, obtains a plurality of data blocks arranged according to a specific rule, and extracts corresponding data blocks from the plurality of data blocks for concatenation. This process yields the device code, first timestamp data, and first data check code, which are then used to verify the authenticity of the display terminal to be verified.

It should be noted that, in order to facilitate the server to concatenate various data blocks and derive the device code, first timestamp data, and first data check code, the server and the display terminal to be verified agree in advance on the corresponding arrangement rule through the first terminal device. This ensures the final concatenation process and verification of the legality of the display terminal to be verified.

Figure 6:
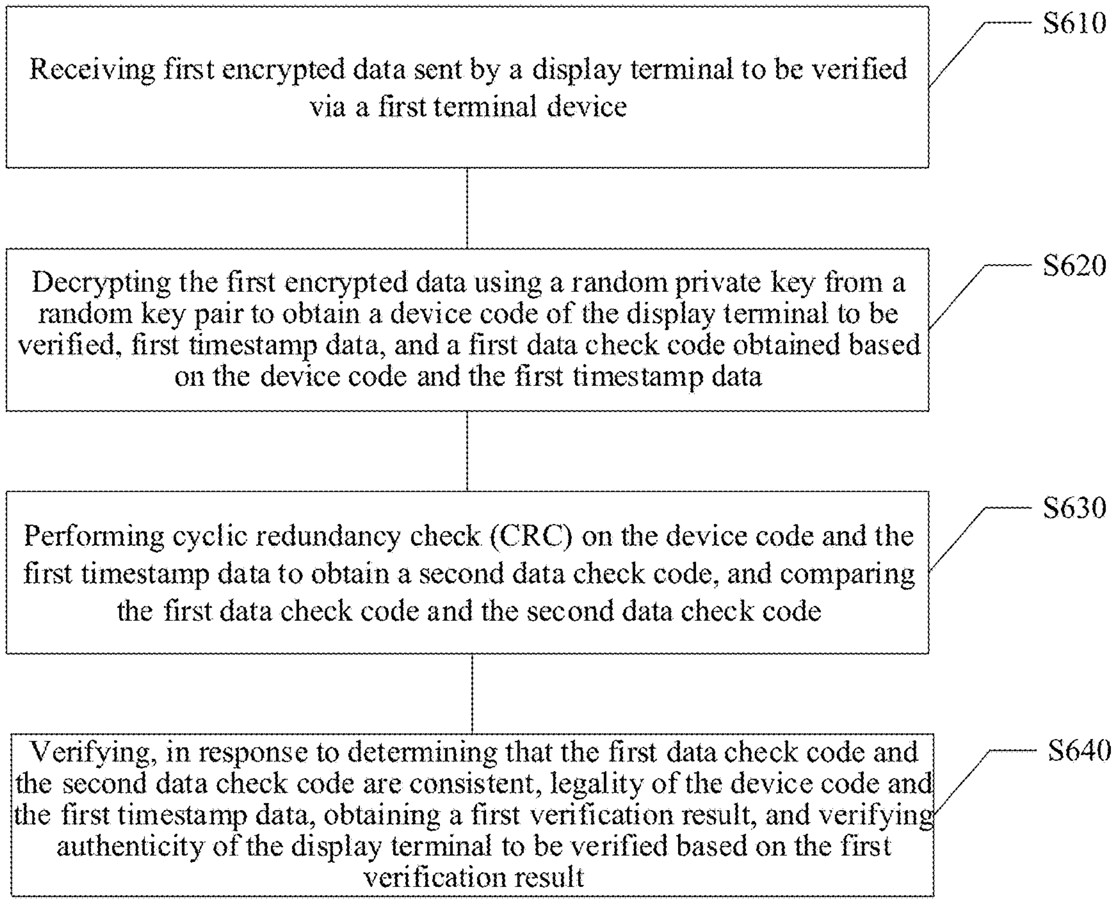
FIG. 6 schematically illustrates a flowchart of a method for verifying a display terminal on a server side according to an exemplary embodiment of the present disclosure.

This exemplary embodiment also provides another method for verifying the display terminal, which can be run on the server, server clusters, or cloud servers. Other platforms may also be used by those skilled in the art to run the method of the present disclosure according to demand, and this is not specifically limited in this exemplary embodiment. Referring to FIG. 6, the method for verifying the display terminal may include the following steps.

Step S610, receiving first encrypted data sent by a display terminal to be verified via a first terminal device.

Step S620, decrypting the first encrypted data using a random private key from a random key pair to obtain a device code of the display terminal to be verified, first timestamp data, and a first data check code obtained based on the device code and the first timestamp data.

Specifically, after receiving the first encrypted data, the server can decrypt it using the random private key from the random key pair, thereby obtaining a plurality of data blocks arranged according to a specific rule. Subsequently, based on an agreed arrangement rule, the server extracts a corresponding number of data blocks from their respective positions and concatenates them to obtain the device code, the first timestamp data, and the first data check code obtained based on the device code and first timestamp data.

Step S630, performing cyclic redundancy check (CRC) on the device code and the first timestamp data to obtain a second data check code, and comparing the first data check code and the second data check code.

Specifically, the server can use the generator polynomial shown in Equation (1) above to perform CRC on the device code and first timestamp data to obtain the second data check code, and then determine whether the first data check code and the second data check code are consistent. If they are consistent, it is determined that the first encrypted data was not tampered with during transmission. If they are not consistent, it indicates possible tampering during transmission of the first encrypted data. This method not only enhances the security of transmitting the first encrypted data but also further improves the accuracy of verification results.

Step S640, verifying, in response to determining that the first data check code and the second data check code are consistent, legality of the device code and the first timestamp data, obtaining a first verification result, and verifying authenticity of the display terminal to be verified based on the first verification result.

Specifically, when the first data check code and the second data check code are determined to be consistent, the legality of the device code and timestamp data can be verified to obtain the first verification result. Finally, the authenticity of the display terminal to be verified can be verified based on the first verification result. Specifically, this can include: determining whether the device code exists in a preset product code library; in response to determining that the device code exists in the preset product code library, obtaining a second current time node at the server upon receiving the first encrypted data, and generating second timestamp data based on the second current time node; calculating a time difference between the second timestamp data and the first timestamp data, and determining whether the time difference is greater than a first preset threshold; and in response to determining that the time difference is less than or equal to the first preset threshold, determining that the display terminal to be verified is a genuine product. It should be noted that, when a touch instruction, acting on an identification and interaction control, is received by the client, it is indicated that information for the start of identification is sent to the server. The information may include instruction-triggered timestamp data generated based on the time node of the trigger of the touch instruction. The instruction-triggered timestamp data can be used to calculate the first preset threshold described above. The calculation principle is that the first preset threshold should be less than or equal to the difference between the instruction-triggered timestamp data and the second timestamp data. This method can avoid the issue of data tampering due to long delay.

When the first and second data check codes are inconsistent, and/or the device code does not exist in the preset product code library, and/or the time difference is greater than the first preset threshold, it is determined that the display terminal to be verified is a counterfeit product.

On one hand, by applying timestamp data in addition to the device code, which cannot be copied, the method for verifying the display terminal as shown in FIG. 6, avoids the issue of lower accuracy of the authenticity verification results of the display terminal caused by illegal manufacturers copying label information generated based on device codes. On the other hand, the legality of the first timestamp data and device code can be verified when the first and second data check codes are determined to be consistent, the method can further avoid the issue of lower accuracy of the authenticity verification results caused by data leakage during the transmission of the first encrypted data from the first device terminal to the server, and further improve the accuracy of the authenticity verification results of the display terminal to be verified.

Finally, when it is determined that the display terminal to be verified is a genuine product, first prompt information, indicating verification success corresponding to the display terminal to be verified, is generated, and the first prompt information is sent to the first terminal device for the first terminal device to display the first prompt information. When it is determined that the display terminal to be verified is a counterfeit product, second prompt information, indicating verification failure corresponding to the display terminal to be verified, is generated, and the second prompt information is sent to the first terminal device for the first terminal device to display the second prompt information. The user can thus determine the authenticity of the display terminal to be verified based on the first or second prompt information displayed by the first terminal device.

Figure 7:
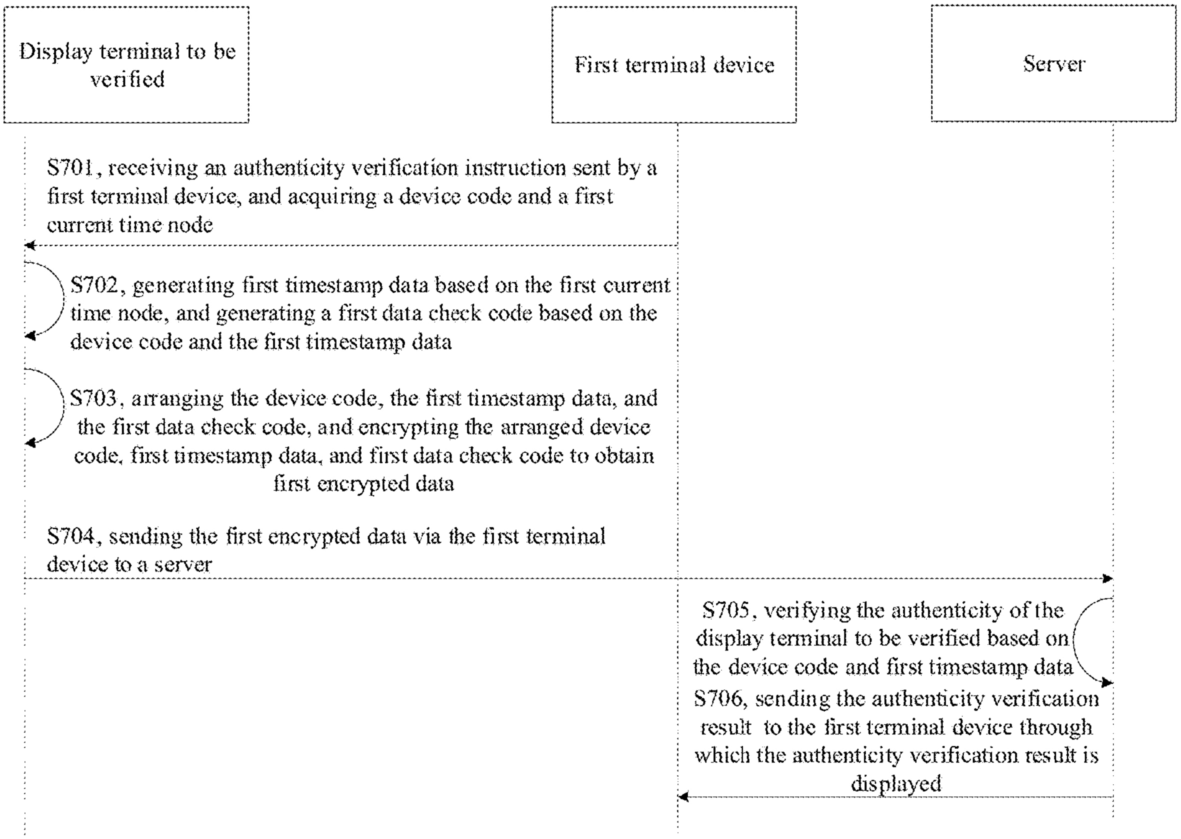
FIG. 7 schematically illustrates an interaction diagram of a method for verifying a display terminal based on an interaction between the display terminal and a server according to an exemplary embodiment of the present disclosure.

The method for verifying the display terminal of the exemplary embodiment of the present disclosure is further explained as well as illustrated below with reference to FIG. 7. Specifically, referring to FIG. 7, the method for verifying the display terminal can include the following steps.

Step S701, receiving, by the display terminal to be verified, an authenticity verification instruction (e.g., 0XAA) sent by a first terminal device, and acquiring a device code and a first current time node.

Step S702, generating, by the display terminal to be verified, first timestamp data based on the first current time node, and generating a first data check code based on the device code and the first timestamp data.

Step S703, arranging, by the display terminal to be verified, the device code, the first timestamp data, and the first data check code, and encrypting the arranged device code, first timestamp data, and first data check code to obtain first encrypted data.

Step S704, sending, by the display terminal to be verified, the first encrypted data via the first terminal device to a server.

Step S705, decrypting, by the server, the first encrypted data to obtain the device code, the first timestamp data, and the first data check code, and verifying the authenticity of the display terminal to be verified based on the device code and first timestamp data.

Step S706, sending, by the server, the authenticity verification result of the display terminal to be verified to the first terminal device through which the authenticity verification result is displayed for the convenience of the user to view it.

It can be seen from the above that, by applying the timestamp data and data check code, the method for verifying the display terminal provided in the exemplary embodiment of the present disclosure can avoid the issue that the prior art cannot effectively prevent the splicing screen from being infringed and counterfeited, because the barcode or QR code is fixed, and the illegal counterfeit manufacturers can produce stickers by copying the barcode or QR code to imitate the product.

Figure 8:
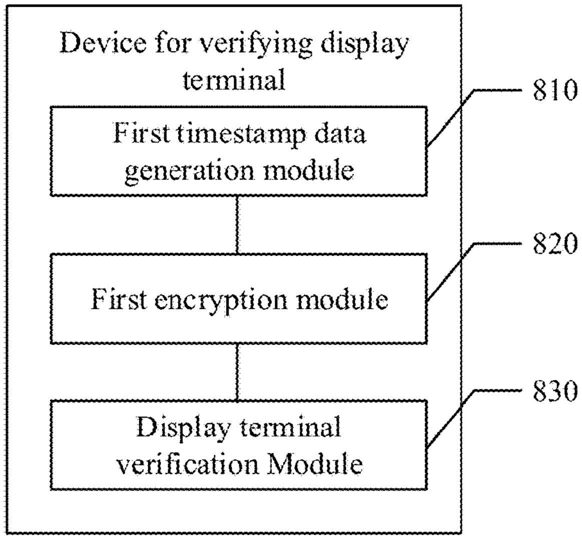
FIG. 8 schematically illustrates a block diagram of a device for verifying a display terminal on the display terminal side according to an exemplary embodiment of the present disclosure.

The present disclosure also provides a device for verifying a display terminal, applied to the display terminal. Referring to FIG. 8, the device for verifying the display terminal can include a first timestamp data generation module 810, a first encryption module 820, and a display terminal verification module 830.

The first timestamp data generation module is configured to acquire a device code of the display terminal to be verified and a first current time node, and generate first timestamp data based on the first current time node.

The first encryption module is configured to perform cyclic redundancy check (CRC) on the first timestamp data and the device code to obtain a first data check code, and encrypt the device code, the first timestamp data, and the first data check code to obtain first encrypted data.

The display terminal verification module is configured to send the first encrypted data via a first terminal device to a server, enabling the server to decrypt the first encrypted data and to verify authenticity of the display terminal to be verified based on the device code, the first timestamp data, and the first data check code that are obtained by the decryption.

In an exemplary embodiment of the present disclosure, acquiring the device code of the display terminal to be verified and the first current time node includes:

- receiving an authenticity verification instruction sent by the first terminal device via a preset communication interface; and
- in response to the authenticity verification instruction, acquiring the device code from an encoding storage unit of the display terminal to be verified, and acquiring the first current time node from a real-time clock chip of the display terminal to be verified.

In an exemplary embodiment of the present disclosure, receiving the authenticity verification instruction sent by the first terminal device via the preset communication interface includes:

- establishing a communication connection between the display terminal to be verified and the first terminal device based on the preset communication interface; and
- receiving the authenticity verification instruction that is sent, via the preset communication interface, by the first terminal device in response to a touch operation on a verification application program corresponding to the display terminal to be verified.

In an exemplary embodiment of the present disclosure, performing CRC on the first timestamp data and the device code to obtain the first data check code includes:

- converting the first timestamp data and the device code into binary to obtain a first byte code, and calculating a first byte length of the first byte code;
- calculating a byte difference between the first byte length and a preset byte length, and determining a second byte length of a padding character required for the first byte code based on the byte difference;
- filling the padding character with the second byte length to a preset position of the first byte code to obtain a first to-be-calculated code; and
- obtaining the first data check code by performing calculation based on a preset generator polynomial and the first to-be-calculated code.

In an exemplary embodiment of the present disclosure, encrypting the device code, the first timestamp data, and the first data check code to obtain the first encrypted data includes:

- arranging the device code, the first timestamp data, and the first data check code according to a preset arrangement rule to obtain first to-be-encrypted data, and encrypting the first to-be-encrypted data based on a preset encryption algorithm to obtain the first encrypted data.

In an exemplary embodiment of the present disclosure, arranging the device code, the first timestamp data, and the first data check code according to the preset arrangement rule to obtain the first to-be-encrypted data includes:

- splitting the device code to obtain a plurality of separate codes each corresponding to a separate character; and
- obtaining the first to-be-encrypted data by inserting each timestamp byte included in the first timestamp data into a middle position between two adjacent separate codes of the plurality of separate codes in a single-spaced or multi-spaced manner, and placing the first data check code after the last separate code.

In an exemplary embodiment of the present disclosure, encrypting the first to-be-encrypted data based on the preset encryption algorithm to obtain the first encrypted data includes:

- receiving a random public key from a random key pair sent by the server, where the random key pair is generated by the sever using a preset asymmetric encryption algorithm; and
- encrypting the first to-be-encrypted data using the random public key to obtain the first encrypted data.

Figure 9:
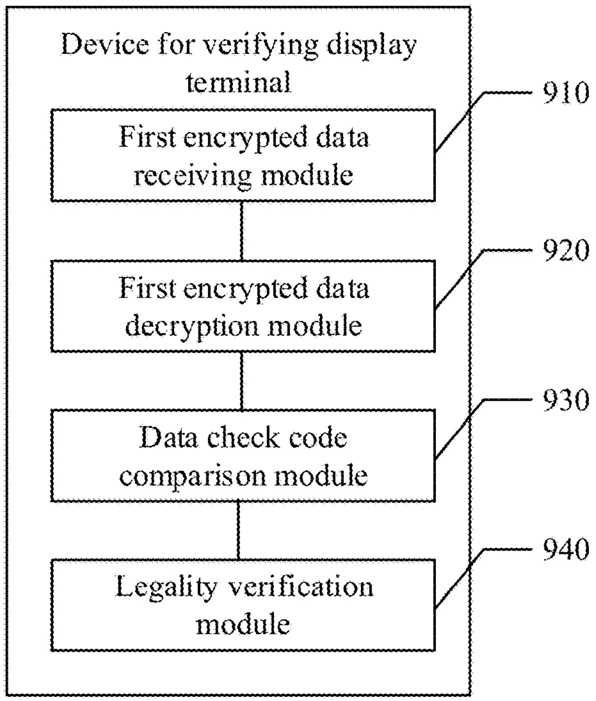
FIG. 9 schematically illustrates a block diagram of a device for verifying a display terminal on a server side according to an exemplary embodiment of the present disclosure.

The present disclosure also provides a device for verifying a display terminal, applied to a server side. Referring to FIG. 9, the device for verifying the display terminal includes a first encrypted data receiving module 910, a first encrypted data decryption module 920, a data check code comparison module 930 and a legality verification module 940.

The first encrypted data receiving module 910 can be configured to receive first encrypted data sent by a display terminal to be verified via a first terminal device.

The first encrypted data decryption module 920 can be configured to decrypt the first encrypted data using a random private key from a random key pair to obtain a device code of the display terminal to be verified, first timestamp data, and a first data check code obtained based on the device code and the first timestamp data.

The data check code comparison module 930 can be configured to perform cyclic redundancy check (CRC) on the device code and the first timestamp data to obtain a second data check code, and compare the first data check code and the second data check code.

The legality verification module 940 can be configured to verify, in response to determining that the first data check code and the second data check code are consistent, legality of the device code and the first timestamp data, obtain a first verification result, and verify authenticity of the display terminal to be verified based on the first verification result.

In an exemplary embodiment of the present disclosure, verifying the legality of the device code and the first timestamp data, obtaining the first verification result, and verifying the authenticity of the display terminal to be verified based on the first verification result, includes:

- determining whether the device code exists in a preset product code library;
- in response to determining that the device code exists in the preset product code library, obtaining a second current time node at the server upon receiving the first encrypted data, and generating second timestamp data based on the second current time node;
- calculating a time difference between the second timestamp data and the first timestamp data, and determining whether the time difference is greater than a first preset threshold; and
- in response to determining that the time difference is less than or equal to the first preset threshold, determining that the display terminal to be verified is a genuine product.

In an exemplary embodiment of the present disclosure, the device for verifying the display terminal further includes:

- a display terminal authenticity determination module configured to, in response to determining that the first data check code and the second data check code are inconsistent, and/or that the device code does not exist in the preset product code library, and/or that the time difference is greater than the first preset threshold, determine that the display terminal to be verified is a counterfeit product.

In an exemplary embodiment of the present disclosure, the device for verifying the display terminal further includes:

a first prompt information generation module which may configured to, in response to determining that the display terminal to be verified is the genuine product, generate first prompt information indicating verification success corresponding to the display terminal to be verified, and send the first prompt information to the first terminal device for the first terminal device to display the first prompt information;

a second prompt information generation module which may configured to, in response to determining that the display terminal to be verified is the counterfeit product, generate second prompt information indicating verification failure corresponding to the display terminal to be verified, and send the second prompt information to the first terminal device for the first terminal device to display the second prompt information.

The specific details of each module in the device for verifying the display terminal described above have been detailed in the corresponding method for verifying the display terminal, and therefore are not repeated here.

It should be noted that although several modules or units for executing actions of the device have been mentioned in detail in the preceding description, division of these modules or units is not mandatory. In fact, according to the embodiments of the present disclosure, features and functions of two or more modules or units mentioned above can be realized in a single module or unit. Conversely, features and functions of one module or unit mentioned above can be further divided into multiple modules or units for implementation.

Furthermore, although the steps of the method in the present disclosure have been described in a specific sequence in the accompanying drawings, this does not require or imply that these steps must be performed in this specific sequence or that all steps shown must be performed to achieve the desired result. Additionally or alternatively, some steps may be omitted, multiple steps may be combined into a single step, and/or a single step may be divided into multiple steps, etc.

In an exemplary embodiment of the present disclosure, an electronic device capable of implementing the above methods is also provided.

Those skilled in the art will appreciate that various aspects of the present disclosure can be implemented as systems, methods, or program products. Therefore, various aspects of the present disclosure may be implemented in the following forms: complete hardware implementation, complete software implementation (including firmware, microcode, etc.), or combined implementation of hardware and software, which may be collectively referred to as “circuits,” “modules,” or “systems.”

An electronic device 1000 according to this embodiment of the present disclosure is described below with reference to FIG. 10. The electronic device 1000 shown in FIG. 10 is merely an example and should not impose any limitations on the functionality and scope of use of embodiments of the present disclosure.

Figure 10:
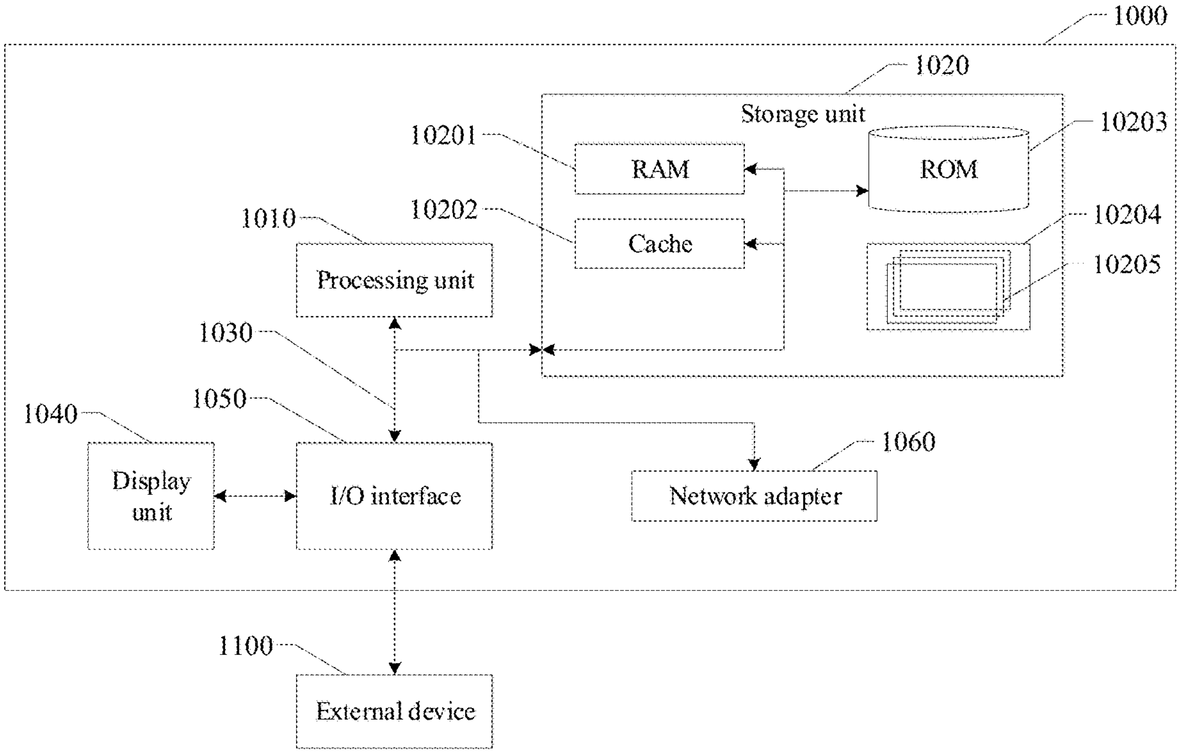
FIG. 10 schematically illustrates an electronic device used to implement a method for verifying a display terminal according to an exemplary embodiment of the present disclosure.

As shown in FIG. 10, the electronic device 1000 takes the form of a general computing device. Components of the electronic device 1000 can include, but are not limited to: at least one processing unit 1010, at least one storage unit 1020, a bus 1030 connecting various system components (including storage unit 1020 and processing unit 1010), and a display unit 1040.

The storage unit stores program code that can be executed by the processing unit 1010 to enable the processing unit 1010 to execute steps described of this specification according to various exemplary embodiments of the present disclosure. For example, the processing unit 1010 can execute steps as shown in FIG. 1, e.g., S110, acquiring a device code of the display terminal to be verified and a first current time node, and generating first timestamp data based on the first current time node; step S120, performing cyclic redundancy check (CRC) on the first timestamp data and the device code to obtain a first data check code, and encrypting the device code, the first timestamp data, and the first data check code to obtain first encrypted data; or step S130, sending the first encrypted data via a first terminal device to a server, enabling the server to decrypt the first encrypted data and to verify authenticity of the display terminal to be verified based on the device code, the first timestamp data, and the first data check code that are obtained by the decryption.

The processing unit 1010 can also execute steps as shown in FIG. 6, e.g., step S610, receiving first encrypted data sent by a display terminal to be verified via a first terminal device; step S620, decrypting the first encrypted data using a random private key from a random key pair to obtain a device code of the display terminal to be verified, first timestamp data, and a first data check code obtained based on the device code and the first timestamp data; step S630, performing cyclic redundancy check (CRC) on the device code and the first timestamp data to obtain a second data check code, and comparing the first data check code and the second data check code; or step S640, verifying, in response to determining that the first data check code and the second data check code are consistent, legality of the device code and the first timestamp data, obtaining a first verification result, and verifying authenticity of the display terminal to be verified based on the first verification result.

The storage unit 1020 may include a readable medium in the form of a volatile storage unit, such as a random access memory unit (RAM) 10201 and/or a cache memory unit 10202, and may further include a read-only memory unit (ROM) 10203.

The storage unit 1020 may also include program/utility 10204 having a set (at least one) of program modules 10205, such program modules 10205 including, but are not limited to: an operating system, one or more application programs, other program modules and program data, each of these examples or combinations thereof may include an implementation in a network environment.

The bus 1030 may be one or more of several types of bus structures, including a storage unit bus or storage unit controller, a peripheral bus, a graphics acceleration port, a processing unit, or a local area bus using any of a variety of bus structures.

The electronic device 1000 may also be in communication with one or more external devices 1700 (e.g., keyboards, pointing devices, Bluetooth® devices, etc.), may also be in communication with one or more devices that enable a user to interact with the electronic device 1000, and/or may be in communication with any device (e.g., a router, a modem, etc.) that enables the electronic device 1000 to communicate with one or more other computing devices. Such communication may be carried out via the input/output (I/O) interface 1050. In addition, the electronic device 1000 may also communicate with one or more networks (e.g., a local area network (LAN), a wide area network (WAN), and/or a public network, such as the Internet) via a network adapter 1060. As shown in FIG. 10, the network adapter 1060 communicates with other modules of the electronic device 1000 via the bus 1030. It should be appreciated that, although not shown in the figures, other hardware and/or software modules may be used in conjunction with the electronic device 1000, including, but not limited to: micro-code, device drives, redundant processing units, external disk drive arrays, RAID systems, tape drives, and data backup storage systems, among others.

By the above description of the embodiments, those skilled in the art will appreciate that the exemplary embodiments described herein may be implemented in software, or implemented in software combined with necessary hardware. Therefore, the technical solutions according to the embodiments of the present disclosure, can be embodied as a software product, which can be stored on a non-volatile storage medium (such as a CD-ROM, USB flash drive, mobile hard disk, etc.) or on the network, including a number of instructions for causing a computing device (such as a personal computer, server, terminal device, or network device) to execute steps according to the embodiments of the present disclosure.

In exemplary embodiments of the present disclosure, there is also provided a computer-readable storage medium having stored thereon a program product capable of implementing the methods described above in this specification. In some possible embodiments, various aspects of the present disclosure may also be implemented in the form of a program product including program code which, when run on a terminal device, is used to cause the terminal device to perform the steps described in this specification according to various exemplary embodiments of the present disclosure.

A program product for implementing the above-described methods according to embodiments of the present disclosure may employ a portable compact disk read-only memory (CD-ROM) and include program code, and may be run on a terminal device, such as a personal computer. However, the program product of the present disclosure is not limited thereto, and for the purposes of this document, a readable storage medium may be any tangible medium containing or storing a program that may be used by or in combination with an instruction-executing system, apparatus, or device.

The program product may employ any combination of one or more readable mediums. The readable medium may be a readable signal medium or a readable storage medium. The readable storage medium may, for example, be, but is not limited to, a system, apparatus, or device that is electrical, magnetic, optical, electromagnetic, infrared, or semiconductor, or any combination of the above. More specific examples of readable storage medium (a non-exhaustive list) include: an electrical connection having one or more wires, a portable disk, a hard disk, a random access memory (RAM), a read-only memory (ROM), an erasable programmable read-only memory (EPROM or flash memory), a fiber optic, a portable compact disk read-only memory (CD-ROM), an optical storage device, a magnetic storage device, or any suitable combination of the foregoing.

The computer readable signal medium may include a data signal propagated in baseband or as part of a carrier carrying readable program code. Such propagated data signals may take a variety of forms, including, but not limited to, electromagnetic signals, optical signals, or any suitable combination of the foregoing. The readable signal medium may also be any readable medium other than a readable storage medium, which may send, propagate, or transmit a program for use by, or in conjunction with, an instruction-executing system, apparatus, or device.

The program code contained on the readable medium may be transferred using any suitable medium, including, but not limited to, wireless, wired, fiber optic cable, RF, etc., or any suitable combination of the foregoing.

The program code for performing the operations of the present disclosure may be written in any combination of one or more programming languages, including object-oriented programming languages such as Java, C++, etc., as well as conventional procedural programming languages such as "C" or the like. The program code may be executed entirely on the user computing device, partially on the user device, as a stand-alone software package, partially on the user computing device and partially on a remote computing device, or entirely on a remote computing device or server. In the case of a remote computing device, the remote computing device may be connected to the user computing device via any kind of network, including a local area network (LAN) or a wide area network (WAN), or may be connected to an external computing device (e.g., by utilizing an Internet Service Provider to connect via the Internet).

Furthermore, the drawings are only schematic illustrations of the processing included in the method according to exemplary embodiments of the present disclosure, and are not intended to be limiting. It will be understood that the processing shown in the above-described accompanying drawings does not indicate or limit the chronological order of such processing. It will also be understood that the processing may be performed, for example, synchronously or asynchronously in multiple modules.

Other embodiments of the present disclosure will easily be conceived by those skilled in the art upon consideration of the specification and practice of the inventions disclosed herein. This application is intended to cover any variations, uses, or adaptations of the present disclosure which follow the general principles of the present disclosure and include common knowledge or customary technical means in the art of the present disclosure. The specification and embodiments are to be regarded as exemplary only, and the true scope and spirit of the disclosure is indicated by the claims.

What is claimed is:

1. A method for verifying a display terminal, applied to the display terminal connected to a first terminal device via a preset hardware interface, wherein the first terminal device is connected to a server via a network, the display terminal comprises a Microcontroller Unit, an encoding storage unit and a Real Time Clock (RTC) chip, and the method comprises:

acquiring, by the Microcontroller Unit, a device code of the display terminal recorded in the encoding storage unit and a first current time node generated by the RTC chip, and generating first timestamp data based on the first current time node;

performing, by the Microcontroller Unit, cyclic redundancy check (CRC) on the first timestamp data and the device code to obtain a first data check code;

splitting, by the Microcontroller Unit, the device code to obtain a plurality of separate codes each corresponding to a separate character, and obtaining first to-be-encrypted data by inserting each timestamp byte included in the first timestamp data into a middle position between two adjacent separate codes of the plurality of separate codes in a single-spaced or multi-spaced manner, and placing the first data check code after a last separate code of the plurality of separate codes:

encrypting, by the Microcontroller Unit, the first to-be-encrypted data based on a preset encryption algorithm to obtain first encrypted data; and sending, by the Microcontroller Unit, the first encrypted data via the first terminal device to the server, wherein the first encrypted data is decrypted by the server to verify authenticity of the display terminal based on the device code, the first timestamp data, and the first data check code that are obtained by the decryption;

wherein performing CRC on the first timestamp data and the device code to obtain the first data check code comprises:

converting the first timestamp data and the device code into binary to obtain a first byte code. and calculating a first byte length of the first byte code;

calculating a byte difference between the first byte length and a preset byte length, and determining a second byte length of a padding character required for the first byte code based on the byte difference;

filling the padding character with the second byte length to a preset position of the first byte code to obtain a first to-be-calculated code; and obtaining the first data check code by performing calculation based on a preset generator polynomial and the first to-be-calculated code.

2. The method of claim 1, wherein acquiring the device code of the display terminal and the first current time node comprises:

receiving an authenticity verification instruction sent by the first terminal device via a preset communication interface; and in response to the authenticity verification instruction, acquiring the device code from the encoding storage unit of the display terminal, and acquiring the first current time node from a real-time clock chip of the display terminal.

3. The method of claim 2, wherein receiving the authenticity verification instruction sent by the first terminal device via the preset communication interface comprises:

establishing a communication connection between the display terminal and the first terminal device based on the preset communication interface; and receiving the authenticity verification instruction that is sent, via the preset communication interface, by the first terminal device in response to a touch operation on a verification application program corresponding to the display terminal.

4. The method of claim 1, wherein encrypting the first to-be-encrypted data based on the preset encryption algorithm to obtain the first encrypted data comprises:

receiving a random public key from a random key pair sent by the server, wherein the random key pair is generated by the sever using a preset symmetric encryption algorithm; and encrypting the first to-be-encrypted data using the random public key to obtain the first encrypted data.

5. A non-transitory computer-readable storage medium storing a computer program that, when executed by a processor, causes the processor to perform the method of claim 1.

6. An electronic device, comprising:

a processor; and a memory for storing instructions executable for the processor;

wherein the processor is configured to execute the instructions to perform the method of claim 1.

* * * * *